US006563697B1

(12) United States Patent
Simbeck et al.

(10) Patent No.: US 6,563,697 B1
(45) Date of Patent: May 13, 2003

(54) APPARATUS FOR MOUNTING A DEVICE ON A MOUNTING SURFACE

(75) Inventors: Werner Reinhard Simbeck, Mill Bay (CA); Stewart J. Harding, Victoria (CA); Markus F. Hirschbold, Victoria (CA)

(73) Assignee: Power Measurement, Ltd., Saanichton (CA)

( * ) Notice: Subject to any disclaimer, the term of this patent is extended or adjusted under 35 U.S.C. 154(b) by 119 days.

(21) Appl. No.: 09/791,420

(22) Filed: Feb. 23, 2001

(51) Int. Cl.[7] ................................................. H02B 1/00
(52) U.S. Cl. ..................... 361/668; 200/295; 324/157; 361/679; 361/809; 361/823; 403/325; 439/532
(58) Field of Search .................. 211/94.01, 26, 211/162; 248/27.1, 27.3; 200/293–296, 321, 324; 324/156, 157, 110; 361/600, 634, 636, 652–653, 654, 659, 664–669, 673, 679, 801, 807–810, 822–825; 439/94, 322, 532, 716–717; 403/325, 327

(56) References Cited

U.S. PATENT DOCUMENTS

| 4,225,839 A | | 9/1980 | Martincic | |
|---|---|---|---|---|
| 4,671,697 A | * | 6/1987 | Ando et al. | 403/325 |
| 4,900,275 A | | 2/1990 | Fasano | |
| 4,957,876 A | | 9/1990 | Shibata et al. | |
| 5,001,420 A | | 3/1991 | Germer et al. | |
| 5,047,604 A | * | 9/1991 | Grass et al. | 200/294 |
| 5,056,214 A | | 10/1991 | Holt | |
| 5,192,227 A | | 3/1993 | Bales | |
| 5,418,837 A | | 5/1995 | Johansson et al. | |
| 5,544,312 A | | 8/1996 | Hasbun et al. | |
| 5,548,527 A | | 8/1996 | Hemminger et al. | |
| 5,555,508 A | | 9/1996 | Munday et al. | |
| 5,602,363 A | | 2/1997 | Von Arx | |
| 5,654,081 A | | 8/1997 | Todd | |
| 5,704,805 A | | 1/1998 | Douty et al. | |
| 5,736,847 A | | 4/1998 | Van Doorn et al. | |
| 5,767,790 A | | 6/1998 | Jovellana | |
| 5,880,927 A | | 3/1999 | Kent et al. | |

(List continued on next page.)

FOREIGN PATENT DOCUMENTS

| DE | 4117465 | * | 12/1991 | ................. 361/673 |
|---|---|---|---|---|
| JP | 198332 | * | 6/1993 | ................. 361/673 |
| WO | WO 01/01079 A1 | | 1/2001 | |
| WO | WO 01/01154 A1 | | 1/2001 | |
| WO | WO 01/01155 A1 | | 1/2001 | |
| WO | WO 01/01156 A1 | | 1/2001 | |
| WO | WO 01/01157 A1 | | 1/2001 | |
| WO | WO 01/01159 A1 | | 1/2001 | |
| WO | WO 01/01160 A1 | | 1/2001 | |
| WO | WO 01/55733 A1 | | 8/2001 | |

OTHER PUBLICATIONS

DSP56F801/803/805/807 16–Bit Digital Signal Processor User's Manual Preliminary—Rev. 3.0, ©Motorola, Inc, 2001, 782 pages.

(List continued on next page.)

Primary Examiner—Gregory Thompson
(74) Attorney, Agent, or Firm—Brinks Hofer Gilson & Lione

(57) ABSTRACT

An apparatus is disclosed for mounting or dismounting a device on a mounting surface, for example, the mounting surface of a rail, a molded clip or the like. The apparatus includes a body. To accommodate attachment of the apparatus to the rail, at least a portion of the body can be movably positioned adjacent to the mounting surface. The apparatus also includes a locating feature connected with the body. The locating feature includes a first position that maintains a position of the body during a manufacturing operation and a second position that allows the body to move between an open position and a closed position, for example, after the manufacturing operation has been completed.

54 Claims, 6 Drawing Sheets

U.S. PATENT DOCUMENTS

| | | | | |
|---|---|---|---|---|
| 5,896,393 | A | | 4/1999 | Yard et al. |
| 5,904,592 | A | * | 5/1999 | Baran et al. ................. 439/532 |
| 5,907,476 | A | | 5/1999 | Davidsz |
| 5,933,004 | A | | 8/1999 | Jackson et al. |
| 5,936,971 | A | | 8/1999 | Harari et al. |
| 6,000,034 | A | | 12/1999 | Lightbody et al. |
| 6,008,711 | A | | 12/1999 | Bolam |
| 6,059,129 | A | | 5/2000 | Bechaz et al. |
| 6,064,192 | A | | 5/2000 | Redmyer |
| 6,185,508 | B1 | | 2/2001 | Van Doorn et al. |
| 6,212,278 | B1 | | 4/2001 | Bacon et al. |
| 6,219,656 | B1 | | 4/2001 | Cain et al. |
| 6,262,672 | B1 | | 7/2001 | Brooksby et al. |
| 6,275,168 | B1 | | 8/2001 | Slater et al. |

OTHER PUBLICATIONS

1991, Robert Bosch, "CAN Specification Version 2.0", 68 pages.

A. Lakshmikanth and Medhar M. Morcos, Article "*A Power Quality Monitoring System: A Case Study in DSP–Based Solutions for Power Electronics,*" IEEE Transactions on Instrumentation and Measurement vol. 50. No. 3 Jun. 2001, 8 pages.

Niall Murphy article, Internet Appliance Design "*Forget Me Not*", Embedded Systems Programming Jun. 2001, 4 pages.

ION® Technology, Meter Shop User's Guide, ©Power Measurement Ltd., Revision Date May 10, 2001, 48 pages.

Electro Industries/Gauge Tech DM Series—specification brochure, "DMMS 425 *Low–Cost Multifunction Power Monitoring Outperforms All Others in its Class*", 4 pages.

Motorola™ Preliminary Information Application Brief "*Electronic Energy Meter with Powerline Modem on DSP56F80x*", DigitalDNA from Motorola, ©2000 Motorola, Inc., 2 pages.

PM130 Serials TrueMeter™—The Low Cost Analog Replacement, specifications, Satec, Inc., 2 pages.

*System Manager Software Setup Guide*, Version 3.1, p. 37, 1999.

*POWERLOGIC System Manager™ 3000 Software Family*, Square D Schneider Electric, Bulletin No. 3080HO9601T10/98, Oct. 1999.

*7700 Ion 3–Phase Power Meter, Analyzer and Controller*, pp. 1–8, Nov. 30, 2000.

*7700 ION® User's Guide*, Version 2.0, Appendix pp. A1–A8, Filed as early as Sep. 21, 1998.

*7700 ION® Revenue Meter Programming Key*, pp. 1–4, Aug. 6, 1997.

Quick Facts Sheet, "6200 ION Compact Modular Power & Energy Meter", Power Measurement, Dec. 2000, 1 page.

Instruction Bulletin, "PowerLogic®, Power Meter Class 3020", Dec. 1998, 4 pages.

Brochure, "PowerLogic®, Power Meter Class 3020", Dec. 1998, 4 pages.

Copy of claims as filed for co–pending application Attorney No. 6270/53, U.S. Ser. No. 09/791,419 filed on Feb. 23, 2001, 3 pages.

* cited by examiner

SECTION A-A

APPARATUS FOR MOUNTING A DEVICE ON A MOUNTING SURFACE

RELATED APPLICATIONS

The following co-pending and commonly assigned U.S. Patent Application has been filed on the same date as the present application. This application relates to and further describes other aspects of the embodiments disclosed in the present application and is herein incorporated by reference.

U.S. pat. application Ser. No. 09/791,419, "ASSEMBLY OF A COMPACT POWER DEVICE", filed concurrently herewith.

BACKGROUND

Mounting surfaces, such as the mounting surface of a rail or molded clip, are commonly used to mount devices. Typically, rails of a common type define a common arrangement for the mounting surface. One type of mounting rail is the "DIN" type standard, also known as a "DIN rail," as defined by the European Standards DIN EN 50022, "Specification for Low Voltage Switchgear and Control Gear for Industrial Use. Mounting Rails. Top Hat Rails 35 mm Wide for Snap-On Mounting Equipment". Devices such as programmable logic controllers ("PLC's"), Remote Terminal Units ("RTU's"), protection relays, terminal blocks, fault recorders and meters are typically supplied with hardware, integrated or external, which allows the device to mount to DIN rails for installation and use.

Meters include watt-hour or revenue meters of the type used by energy suppliers to accurately measure electrical energy delivered to customers for the purposes of billing and/or collecting revenue, and power quality meters having power quality monitoring, detection and reporting capabilities. As mentioned above, these devices are often configured to mount or dismount to standard mounting devices, such as a DIN rail, by means of mounting hardware. This permits multiple devices to be conveniently located in a small area.

Known DIN rail hardware is either separately attached to the device or an integral part of the device. In either case, the hardware is typically complex and contains several pieces and moving parts and, as a result, the hardware is often costly to manufacture and, because of the multiple parts, more susceptible to breakage. Accordingly, there is a need for an improved, simplified mounting enclosure that allows the device to be mounted to a DIN rail or other suitable type of mounting surface without adding unnecessary complexity to the device design or manufacture.

Further, the tool used to injection mould plastic is typically split into two parts: the core and the cavity. The core and the cavity, when pressed together, have a space that reflects the shape of the part being injection molded. Molten plastic is injected into this space and, upon cooling, when the core and cavity separate the part is removed. It will be appreciated that a complex part having undercuts or blind cavities will require moving parts inside the core or cavity that must retract before the mold core and cavity can be separated. Further, because machine runtime is included in the manufacturing cost of the part, the step of opening and closing the mold can cause significant per-part cost increases if the mold is designed such that moving parts are required in the mold.

Molds that require moving parts are typically also more expensive to build and maintain and are further susceptible to breakage and reliability concerns. Other securing components utilized in the molding process known in the art include metallic securing parts incorporated into the mounting portion. These parts are added during the molding or assembly process, such as ultrasonically welding, heat staking or physically including them in the mold before plastic injection. This results in a number of operations that must be completed to produce a final mounting portion or device, thereby increasing the part cost.

Thus, there is a need for a reliable, simplified one part, low cost DIN rail mounting feature that can be integrated into a device. There is also a need for an integrated DIN rail mountable device manufactured with a process that contains no moving mold parts.

BRIEF SUMMARY

The preferred embodiments relate to an apparatus for mounting or dismounting a device on a mounting surface, for example, the mounting surface of a rail, a molded clip or the like. In a preferred embodiment the apparatus contains a retaining mechanism that mounts to standard sized surface such as a DIN rail or other mounting surface including the same dimensions of the DIN rail. However, other dimensions for the mounting surface could be used. The retaining mechanism is designed with a geometry such that the tool used to injection mold the plastic material has no moving parts. The acts involved in injection molding a part are as simply closing the mold, filling the mold, opening the mold and ejecting the part.

In particular, the retaining mechanism includes a body. At least a portion of the body is movably positioned adjacent to the mounting surface. The apparatus also includes a locating feature connected with the body. The locating feature includes a first position that maintains a position of the body during a manufacturing operation and a second position that allows the body to move, e.g., between an open position and a closed position after the manufacturing operation has been completed.

DETAILED DESCRIPTION

Preferred embodiments relate to a mounting mechanism for mounting or dismounting a device on a mounting surface, for example, the mounting surface of a rail, molded clip or the like. Designers often are required to design mounting or retaining mechanisms while optimizing the overall combination of cost and reliability of the entire device. The mounting or retaining mechanism could be used to mount an electric meter for sensing electrical parameters from an electric circuit.

Figure 1A:
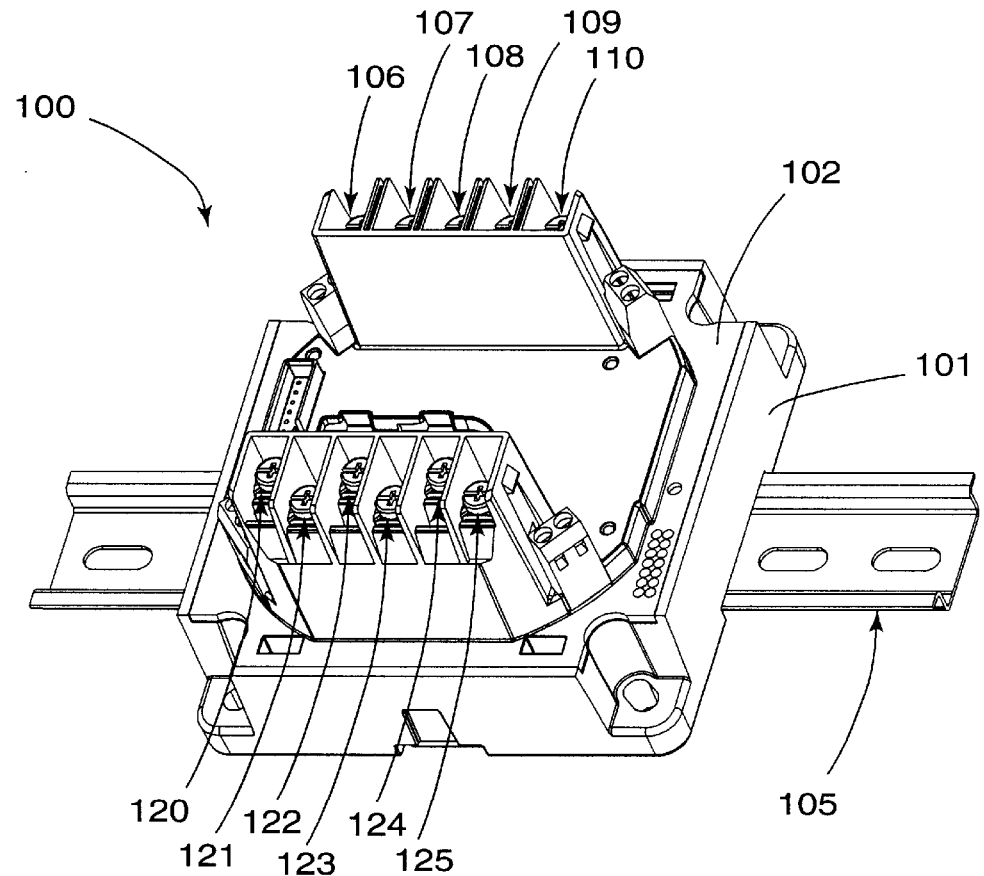
FIG. 1a illustrates a perspective view of the device mounted to a DIN rail.
Figure 1B:
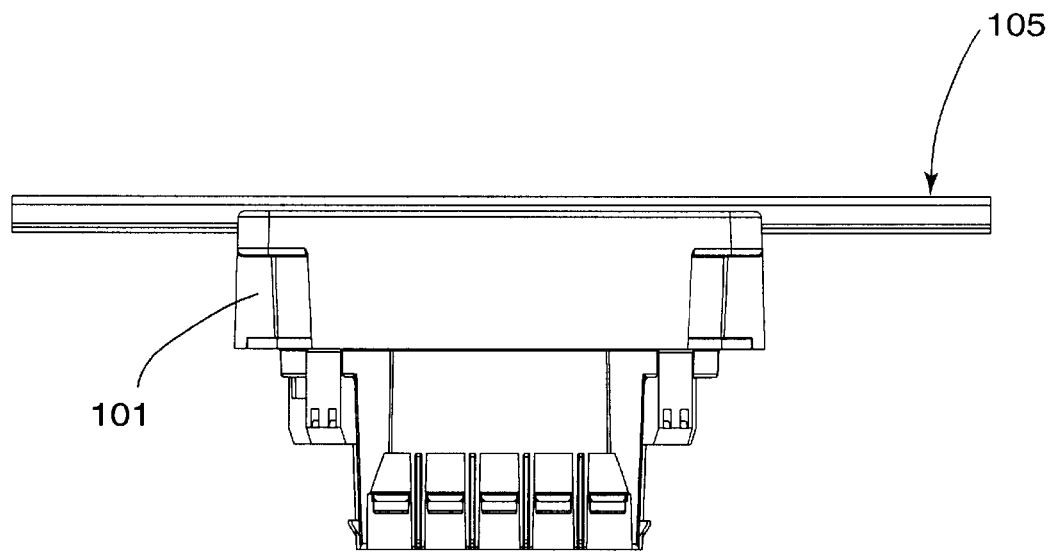
FIG. 1b illustrates a top view of the device mounted to a DIN rail.

Referring now to the drawings, FIGS. 1a and 1b show perspective and top views respectively of a device 100 attached to a mounting surface such as rail 105 or a molded clip in the shape of the rail. In a preferred embodiment, the device 100 is an electric meter and includes a base 101 and a cover 102, the base being attached to the rail 105. The base 101 having terminals such as voltage connectors 106 107 108 109 110 and current connectors 120 121 122 123 124 125 inset into the base 101. Circuitry is included with the base that operates to sense at least one electrical power parameter. An exemplary device 100 is the type 6200, manufactured by Power Measurement Ltd. located in Saanichton, B.C., Canada. In a preferred embodiment the rail is a DIN rail or similar type conforming to the European Standards DIN EN 50022, "Specification for Low Voltage Switchgear and Control Gear for Industrial Use. Mounting Rails. Top Hat Rails 35 mm Wide for Snap-On Mounting Equipment".

Figure 2:
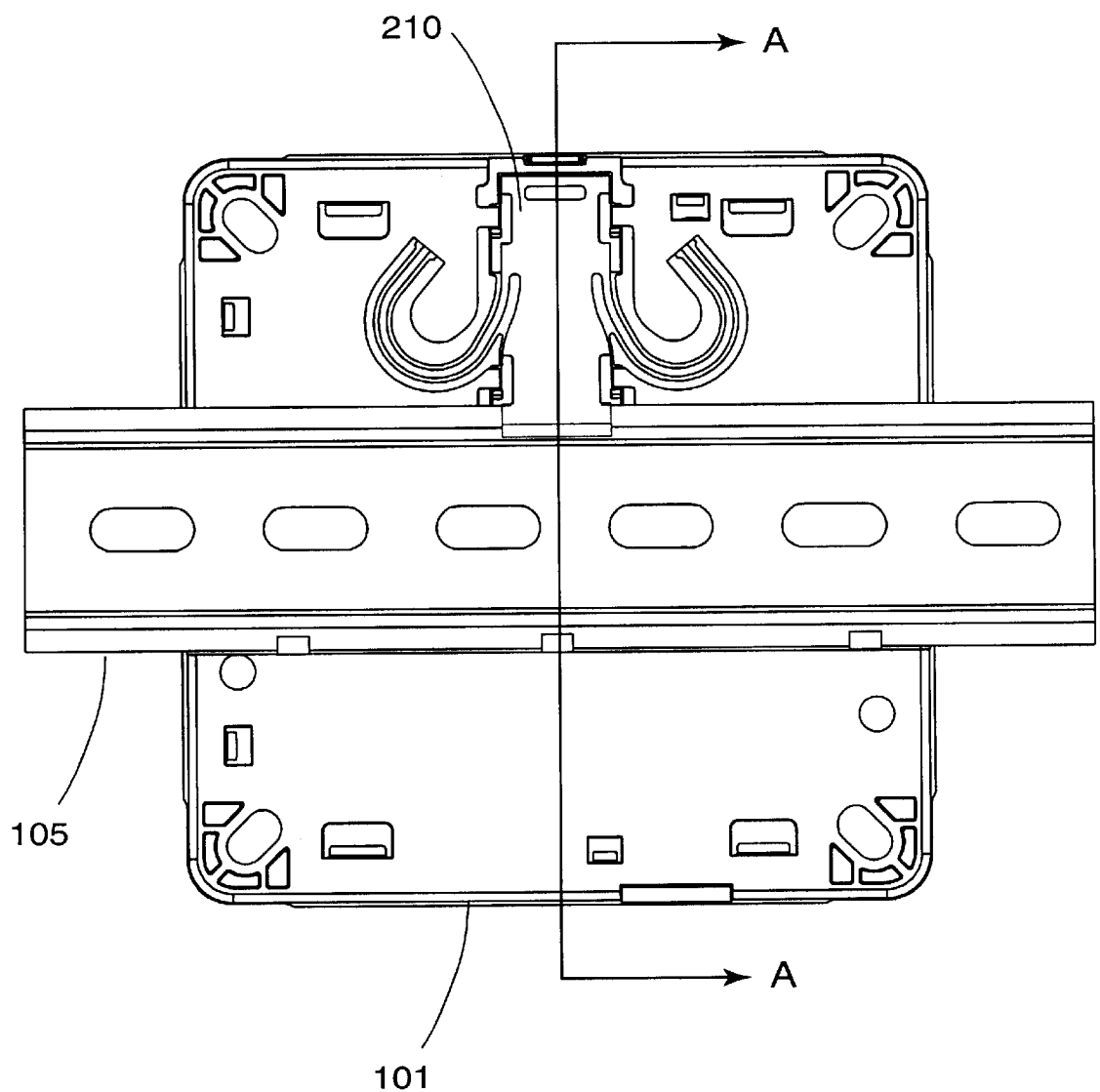
FIG. 2 illustrates the back view of the base and mounting device.
Figure 3:
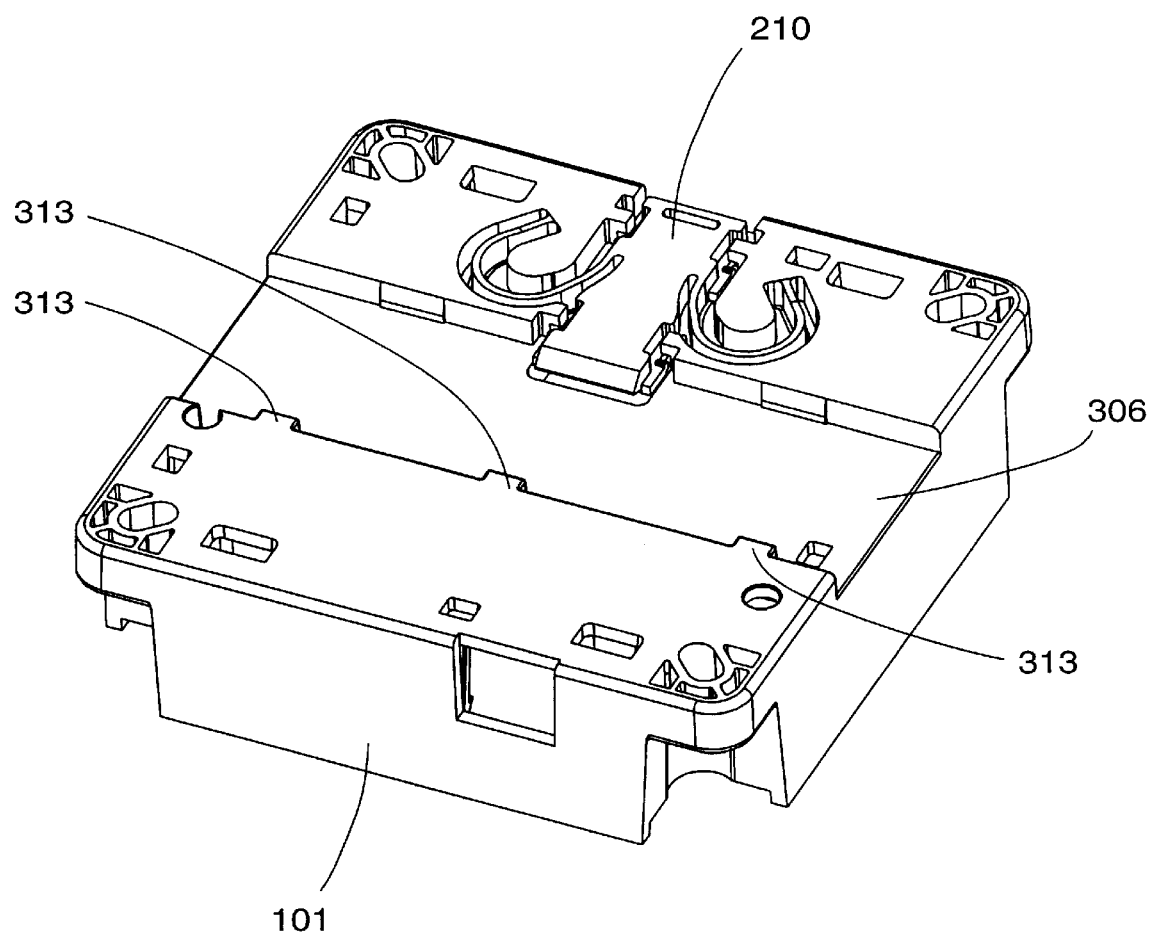
FIG. 3 illustrates a back perspective view of the base and mounting device.

FIG. 2 illustrates the back view of the base 101 attached to the DIN rail 105. A retaining mechanism 210 aids in retaining the base to the DIN rail 105. Referring now to FIG. 3, the retaining mechanism 210 is shown without the DIN rail in place. In the preferred embodiment the base is injection molded out of plastic, the retaining mechanism 210 being molded as an integral part of the base 101. In an alternate embodiment the retaining mechanism 210 is manufactured separately from the base 101 and attached during the final assembly process. The base 101 also contains a depression 306 which is operable to receive and retain the DIN rail 105 (not shown) in place. In the preferred embodiment, the depression 306 also contains multiple retaining tabs 313 which aid in holding the DIN rail 105 in place.

Figure 4A:
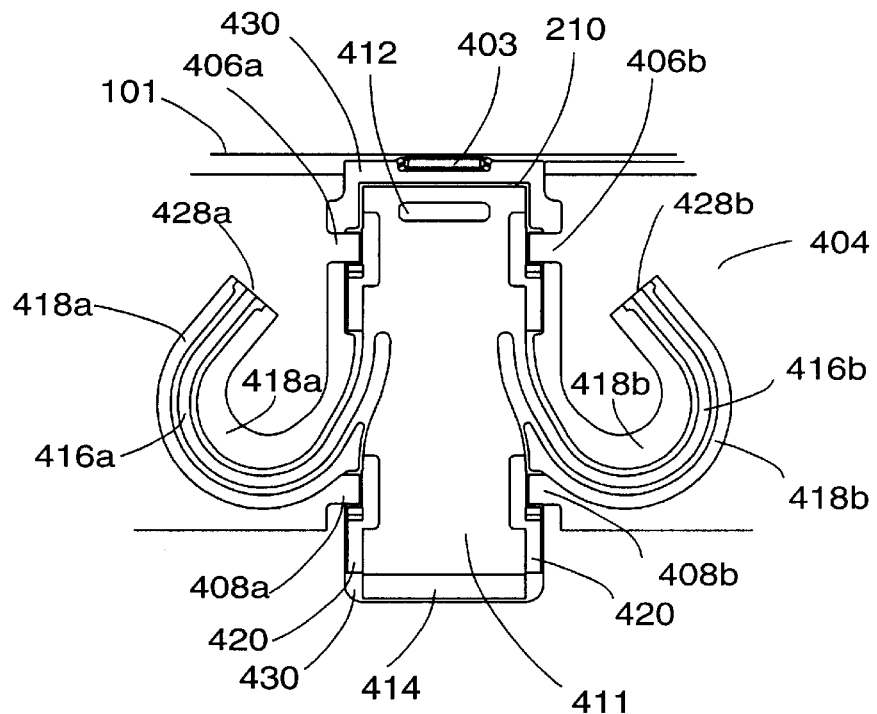
FIG. 4a illustrates the front view of the mounting device in its manufacturing position.
Figure 4B:
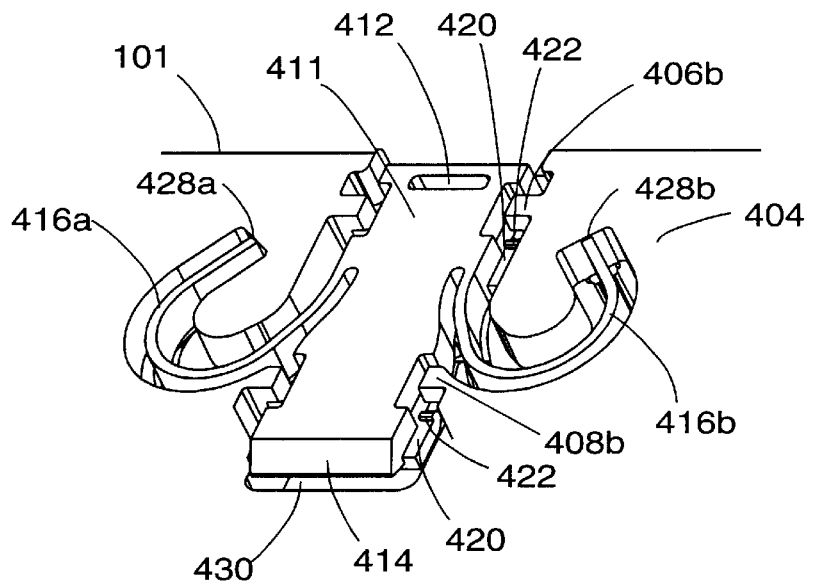
FIG. 4b illustrates a perspective view of the mounting device in its manufacturing position.
Figure 4C:
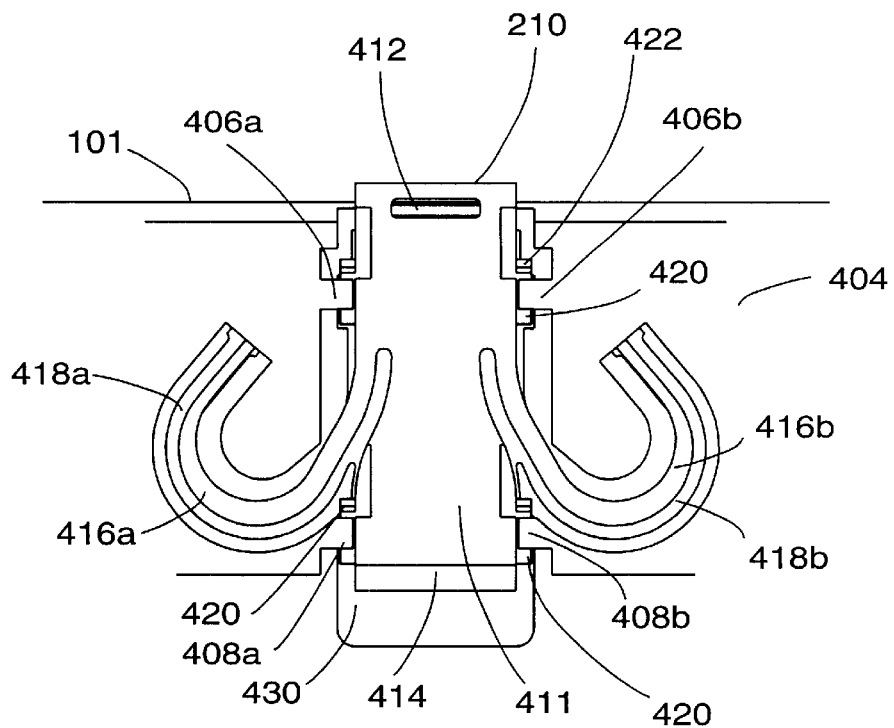
FIG. 4c illustrates a front view of the mounting device in its closed position.
Figure 4D:
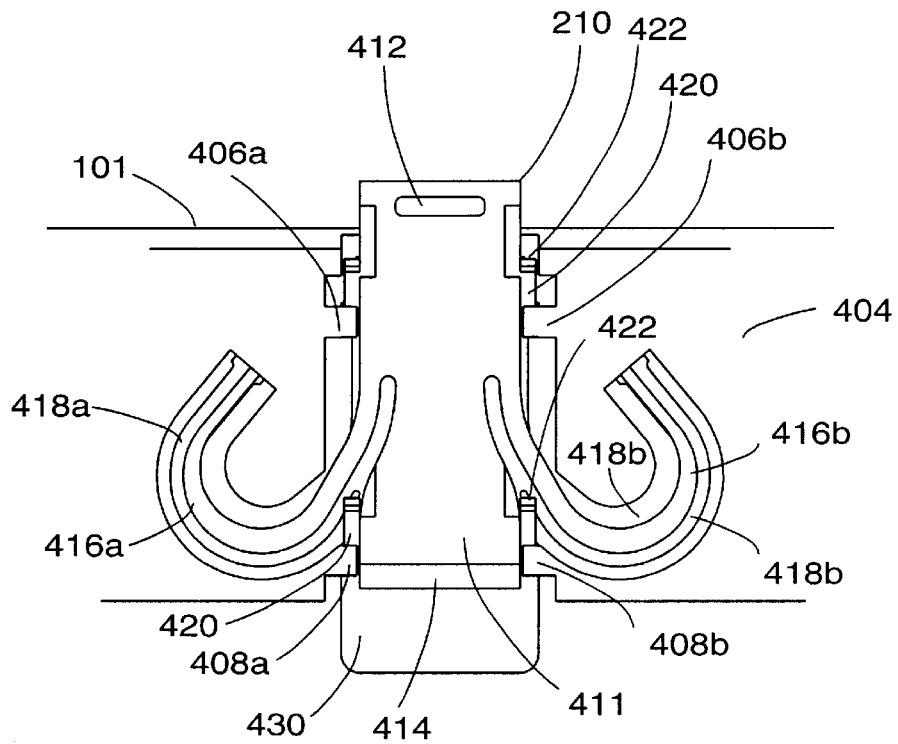
FIG. 4d illustrates a front view of the mounting device in its open position.

FIGS. 4a and 4b show detailed views of the retaining mechanism 210 in the preferred embodiment. As shown in these figures the retaining mechanism 210 is in the manufacturing position. The manufacturing position is the position the retaining mechanism is in when first released from the injection molding machine. The closed position, as shown in FIG. 4c, has the body 411 of the retaining mechanism 210 displaced away from the depression 306 into a position such that DIN rail may be securely fixed between the retaining mechanism 210 and the base 101. The open position, as shown in FIG. 4d, has the body 411 of the retaining mechanism 210 displaced away from the depression 306 into a position such that the tapered surface 414 can pass over the DIN rail. The retaining mechanism 210 is displaced further away from the depression 306 in the open position than the closed position. How the retaining mechanism travels between the positions is described in more detail below.

Referring back to FIG. 4a, the retaining mechanism 210 is preferably a symmetrical part, thus allowing for even wear on the part. A symmetrical part also prohibits jamming by ensuring one-directional motion of the part. Having a symmetrical part is not necessary but excessive wear and fractures may occur due to uneven loading at a particular point on the part if it is not symmetrical or uniform. It can be appreciated that the invention may function in a similar fashion with the retaining mechanism 210 either symmetrical or non-symmetrical.

The retaining mechanism 210 comprises a body 411 connected to two flexible arms 416a 416b which extend outwardly from either side of the body 411 and terminate on the base 101 at connection point 428a 428b. In the preferred embodiment the flexible arms 416a 416b are "U" shaped in order to conserve space however it can be appreciated by those skilled in the art that an alternate geometry of arms, such as straight arms, can be utilized. Further, in the preferred embodiment the body 411 slides along its longitudinal axis in a plane parallel to the top surface 404, towards or away from the DIN rail depression 306. Hereafter, this sliding action will be described as moving vertically.

The base 101 contains a body opening 430 which is slightly larger than the shape of the body 411, and an arm opening 418a 418b which extends on either side of the flexible arms 416a 416b to the connection point 428a 248b. In an alternate embodiment the body opening 430 is not necessary, but is a result of the non-moving mold design as described earlier. Similarly the size of the body opening is a result of the non-moving mold design as described earlier. The arm openings 418a 418b are also a result of the non-moving mold design described earlier.

The retaining mechanism 210 has a slot 412 at one end, which is utilized to aid in moving the retaining mechanism 210 by the use of a screwdriver or other similar tool. In the preferred embodiment when the retaining mechanism is in the closed position, as shown in FIG. 4c, the slot 412 is aligned with a recess 403 on the base 101, thereby allowing the mounting recess to be more easily accessible for movement when the device is mounted. The retaining mechanism 210 also has a tapered surface 414 which aids in the engagement and retaining of the retaining mechanism 210 to the DIN rail.

Further, the retaining mechanism includes a guidance projection 420, e.g., a wall that protrudes outwardly from the edge of the body 411. In an alternate embodiment, several smaller projections may be used. The guidance projection 420 contains locating features 422 which are shaped as a one way "snap" feature, that allows the body 411 to move vertically to a certain point, but not return the body 411 to its original position. More specifically, the locating features 422 allow the retaining mechanism 210 to move in one direction from the manufacturing position to the closed position, but not move back to the manufacturing position. A complete description of how the retaining mechanism 210 travels between the positions will be described in more detail below.

Referring to FIG. 4c, the top surface 404 of the base 101 contains locating projections 406a 406b 408a 408b which are adapted to aid in restricting the movement of the body 411 when the retaining mechanism 210 is in the closed position. FIG. 4d, which shows the open position, also contains the same features. The two directions of movement that the locating projections 406a 406b 408a 408b limit are in a vertical direction, the restriction dependent on the position of the retaining mechanism 210, and in a direction towards the top surface 404.

Because the body opening 430 is created during the manufacturing process, the retaining mechanism 210 is prevented from moving in the normal direction of pressing into the body opening 430 when the device is either in the closed position or the open position, or in transition between the two positions. The guidance projection, in conjunction with the locating projections, further limit movement in a horizontal direction.

In the manufacturing position (FIG. 4a) the locating features 422 are positioned vertically below their respective locating projections 406a 406b 408a 408b. In either the closed or open position (FIG. 4c and 4d) the locating features 422 are positioned vertically above their respective locating projections 406a 406b 408a 408b.

Figure 5:
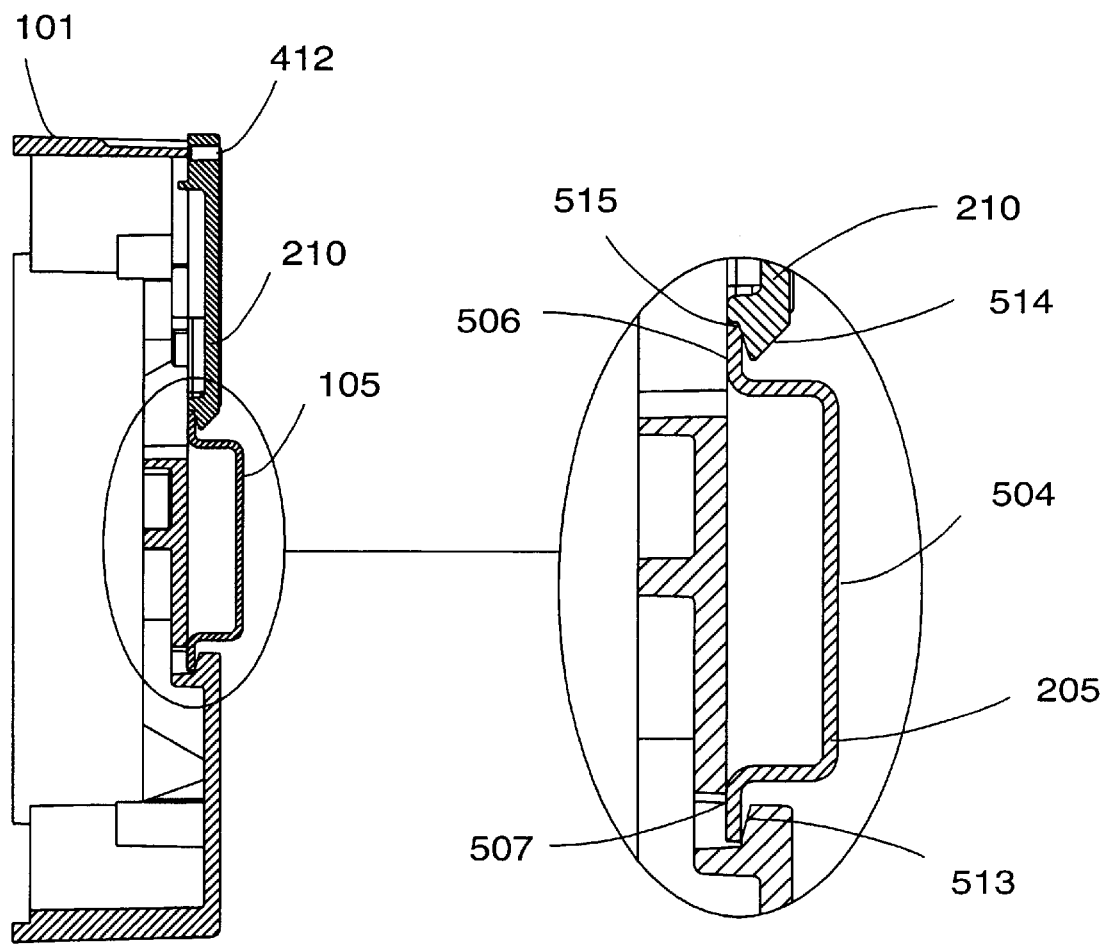
FIG. 5 illustrates a cross-sectional view A—A of the base and DIN rail in FIG. 2.

Referring now to FIG. 5 the base 101 of the device is attached to the DIN rail 105. FIG. 5 illustrates the retaining mechanism in the closed position. In the preferred embodiment the DIN rail 105, or other compatible rail, is in a "C" shape geometry with flanges 506 507 extending outwardly from each edge. In a typical installation the face 504 of the DIN rail is attached to a wall or other mounting surface. The base 101 contains a retaining tab 513 (313 FIG. 3) which retains the first flanges 507 of the DIN rail 105. The retaining mechanism 210 also contains a second lip 515 which retains the second flange 506 of the DIN rail.

In the preferred embodiment the device is engaged to the DIN rail by locating the first flange 507 of the DIN rail into the retaining tab 513 located on the base 101. Multiple retaining tabs may be utilized to increase the mechanical stability of the device while mounted on the DIN rail. In the preferred embodiment the retaining mechanism 210 is in the closed position prior to attaching the device to the DIN rail 105. The base 101 is then pivoted towards the DIN rail 105 about the retaining tab 513, the second flange 506 contacting the tapered surface 514 of the retaining mechanism and causing the retaining mechanism 210 to displace from the closed position to the open position, which is when the second flange 506 passes the tapered surface 514.

Finally, the flex arms 416a 416b urge the retaining mechanism to retract to the closed position where it retains the second flange 506 of the DIN rail with the second lip 515. To disengage the device from the DIN rail the retaining mechanism is moved to the open position so the second flange 506 can be released past the tip of the tapered surface 514. Once the device has been released the retaining mechanism 210 returns to the closed position, but is unable to return to the manufacturing position as the locating features 422 prevent this.

It is to be understood that other changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

What is claimed is:

1. Apparatus for mounting or dismounting a device on a mounting surface, the apparatus comprising:
   a body, the body being integrally molded with a base, where at least a portion of the body is movably positioned adjacent to the mounting surface; and
   a locating feature integrally molded with the body, wherein the locating feature is configured to operate in a first position to maintain a stationary manufacturing position of the body during a manufacturing operation and a second position that allows the body to move between an open position and a closed position.

2. The apparatus of claim 1 wherein the at least a portion of the body movably accommodates the mounting and dismounting of the device to the mounting surface.

3. The apparatus of claim 1 further including at least one flexible arm connected with the body.

4. The apparatus of claim 3 wherein the at least one flexible arm accommodates movement of the body.

5. The apparatus of claim 4 wherein the at least one flexible arm is generally U-shaped.

6. The apparatus of claim 5 wherein the base includes an opening for accommodating the body.

7. The apparatus of claim 6, wherein the at least one flexible arm includes a first end and a second end, wherein the base connects with the first end of the flexible arm and the body connects with the second end of the flexible arm.

8. The apparatus of claim 1 wherein the body further includes a slot positioned to accommodate a tool to move the body.

9. The apparatus of claim 1 further including a projection portion of the body, wherein the projection portion of the body connects the locating feature with the body.

10. The apparatus of claim 1 further including a rail, wherein the rail comprises the mounting surface.

11. Apparatus for mounting or dismounting a device on a mounting surface, the apparatus comprising:
    a body, wherein at least a portion of the body is movably positioned adjacent to the mounting surface, the body being integrally molded with a base;
    a locating feature integrally molded with the body;
    a locating projection integrally molded with the body, that projects adjacent to the body;
    wherein the locating feature is positioned in a stationary first position during a manufacturing operation and is positioned in a second position during the mounting and dismounting of the device to the mounting surface.

12. The apparatus of claim 11, wherein when the locating feature is positioned adjacent the locating projection the body is movable between an open position and a closed position.

13. The apparatus of claim 12 wherein the at least a portion of the body movably accommodates the mounting and dismounting of the device to the rail.

14. The apparatus of claim 11 further including at least one flexible arm connected with the body.

15. The apparatus of claim 14 wherein the at least one flexible arm accommodates movement of the body.

16. The apparatus of claim 15 wherein the at least one flexible arm is generally U-shaped.

17. The apparatus of claim 14 wherein the base includes an opening for accommodating the body.

18. The apparatus of claim 17, wherein the at least one flexible arm includes a first end and a second end, wherein the base connects with the first end of the flexible arm and the body connects with the second end of the flexible arm.

19. The apparatus of claim 18, wherein the base, the flexible arm and the body are integrally manufactured.

20. The apparatus of claim 19 wherein the base, the flexible arm and the body comprise integrally manufactured plastic materials.

21. The apparatus of claim 11 wherein the body further includes a slot positioned to accommodate a tool to move the body.

22. A device mountable on and dismountable from a mounting surface, the device comprising:
    an enclosure including at least one cavity, the cavity being adapted to accommodate at least one terminal;
    a body, wherein at least a portion of the body is movably positioned adjacent to the mounting surface;
    a base, the base comprising an opening for accommodating the body;
    the body and the base being integrally molded with the enclosure; and
    at least one flexible arm integrally molded to connect the base to the body, wherein the flexible arm is operative to accommodate movement of the body in an open and closed position.

23. The apparatus of claim 22, wherein the body further includes a projection, the projection further including a locating feature, the locating feature operative to allow a first position to maintain a manufacturing position of the body during a manufacturing operation and at least one of the closed position and the open position.

24. In an electrical meter for sensing electrical parameters from an electric circuit, the meter comprising:
   a base including at least one terminal, the terminal coupled to the electric circuit;
   circuitry included with the base, the circuitry being operable to sense at least one electrical power parameter;
   a body integrally molded to the base, where at least a portion of the body is movably positioned adjacent to a mounting surface; and
   a locating feature integrally molded with the body, wherein the locating feature is configured to operate in a first position to maintain a manufacturing position of the body during a manufacturing operation and a second position that allows the body to move between an open position and a closed position.

25. The meter of claim 24 wherein the at least a portion of the body movably accommodates the mounting and dismounting of the meter to the mounting surface.

26. The meter of claim 24 further including at least one flexible arm connected with the body.

27. The meter of claim 26 wherein the at least one flexible arm accommodates movement of the body.

28. The meter of claim 27 wherein the at least one flexible arm is generally U-shaped.

29. The meter of claim 28 wherein the base includes an opening for accommodating the body.

30. The meter of claim 29, wherein the at least one flexible arm includes a first end and a second end, wherein the base connects with the first end of the flexible arm and the body connects with the second end of the flexible arm.

31. The meter of claim 24 wherein the body further includes a slot positioned to accommodate a tool to move the body.

32. The meter of claim 24 further including a projection portion of the body, wherein the projection portion of the body connects the locating feature with the body.

33. The meter of claim 24 further including a rail, wherein the rail comprises the mounting surface.

34. A device mountable on a mounting surface, the device comprising:
   an enclosure including a base, the enclosure being adapted to at least partially enclose electrical circuitry;
   a body, the body being integrally molded with the base of the enclosure, where at least a portion of the body is movable; and
   a locating feature integrally molded with the body, wherein the locating feature is configured to operate in a first position to maintain a manufacturing position of the body during a manufacturing operation and a second position that allows the body to move between an open position and a closed position.

35. The device of claim 34 wherein the movable portion of the body movably accommodates the mounting and dismounting of the device to the mounting surface.

36. The device of claim 34 farther including at least one flexible arm connected with the body.

37. The device of claim 36 wherein the at least one flexible arm accommodates movement of the body.

38. The device of claim 37 wherein the at least one flexible arm is generally U-shaped.

39. The device of claim 38 wherein the base includes an opening for accommodating the body.

40. The device of claim 39, wherein the at least one flexible arm includes a first end and a second end, wherein the base connects with the first end of the flexible arm and the body connects with the second end of the flexible arm.

41. The device of claim 34 wherein the body further includes a slot positioned to accommodate a tool to move the body.

42. The device of claim 34 further including a projection portion of the body, wherein the projection portion of the body connects the locating feature with the body.

43. The device of claim 34 further including a rail, wherein the rail comprises the mounting surface.

44. A device mountable on and dismountable from a mounting surface, the device comprising:
   an enclosure being adapted to accommodate at least one terminal;
   a body, wherein at least a portion of the body is movably positioned adjacent to the mounting surface, the body being integrally molded with the enclosure;
   a locating feature integrally molded with the body;
   a locating projection integrally molded with the body, that projects adjacent to the body;
   wherein the locating feature is positioned in a first position during a manufacturing operation and is positioned in a second position during the mounting and dismounting of the device to the mounting surface.

45. The device of claim 44, wherein, when the locating feature is positioned adjacent the locating projection, the body is movable between an open position and a closed position.

46. The device of claim 45 wherein the at least a portion of the body movably accommodates the mounting and dismounting of the device to the rail.

47. The device of claim 44 further including at least one flexible arm connected with the body.

48. The device of claim 47 wherein the at least one flexible arm accommodates movement of the body.

49. The device of claim 48 wherein the at least one flexible arm is generally U-shaped.

50. The device of claim 47 wherein the base includes an opening for accommodating the body.

51. The device of claim 50, wherein the at least one flexible arm includes a first end and a second end, wherein the base connects with the first end of the flexible arm and the body connects with the second end of the flexible arm.

52. The device of claim 51, wherein the base, the flexible arm and the body are integrally manufactured.

53. The device of claim 52 wherein the base, the flexible arm and the body comprise integrally manufactured plastic materials.

54. The device of claim 44 wherein the body further includes a slot positioned to accommodate a tool to move the body.

* * * * *

UNITED STATES PATENT AND TRADEMARK OFFICE
CERTIFICATE OF CORRECTION

PATENT NO. : 6,563,697 B1 Page 1 of 1
DATED : May 13, 2003
INVENTOR(S) : Werner R. Simbeck et al.

It is certified that error appears in the above-identified patent and that said Letters Patent is hereby corrected as shown below:

Column 7,
Line 61, before "including" delete "farther" and substitute -- further -- in its place.

Signed and Sealed this

Thirteenth Day of April, 2004

JON W. DUDAS
*Acting Director of the United States Patent and Trademark Office*